(12) United States Patent
Kamaguchi

(10) Patent No.: US 7,953,282 B2
(45) Date of Patent: May 31, 2011

(54) TELEVISION RECEIVER AND PICTURE PROCESSING METHOD

(75) Inventor: Yutaka Kamaguchi, Tokyo (JP)

(73) Assignee: Sony Corporation (JP)

( * ) Notice: Subject to any disclaimer, the term of this patent is extended or adjusted under 35 U.S.C. 154(b) by 1584 days.

(21) Appl. No.: 10/557,980

(22) PCT Filed: Jun. 9, 2004

(86) PCT No.: PCT/JP2004/008396
§ 371 (c)(1),
(2), (4) Date: Nov. 22, 2005

(87) PCT Pub. No.: WO2004/112378
PCT Pub. Date: Dec. 23, 2004

(65) Prior Publication Data
US 2007/0058712 A1   Mar. 15, 2007

(30) Foreign Application Priority Data

Jun. 10, 2003  (JP) ............................... P2003-165628

(51) Int. Cl.
*G06K 9/36* (2006.01)
*H04N 7/12* (2006.01)

(52) U.S. Cl. .................................. 382/233; 375/240.16

(58) Field of Classification Search ............. 375/240.02–240.29; 382/232–252; 348/607
See application file for complete search history.

(56) References Cited

U.S. PATENT DOCUMENTS 5,568,196 A    10/1996  Hamada et al.
6,061,100 A *   5/2000  Ward et al. .................... 348/607

FOREIGN PATENT DOCUMENTS

| JP | 05-328308 A | 12/1993 |
|---|---|---|
| JP | 07-184169 A | 7/1995 |
| JP | 7-288719 A | 10/1995 |
| JP | 11-113001 A | 4/1999 |
| JP | 11-266440 A | 9/1999 |
| JP | 2002-033941 A | 1/2002 |
| JP | 2002-051234 A | 2/2002 |
| WO | WO-01/61993 A1 | 8/2001 |

* cited by examiner

*Primary Examiner* — Duy M Dang
(74) *Attorney, Agent, or Firm* — Lerner, David, Littenberg, Krumholz & Mentlik, LLP

(57) ABSTRACT

Encoded picture data is input to an MPEG decoding circuit. Decoded picture data is generated according to motion information. The decoded picture data is output to a motion adaptive picture processor. The MPEG decoding circuit supplies the motion information to a time axis compensation circuit. The time axis compensation circuit supplies the motion information to the motion adaptive picture processor at a timing in which decoded picture data that contains the motion information is supplied from the MPEG decoding circuit to the motion adaptive picture processor. The motion adaptive picture processor determines whether picture data that is being processed is a moving picture or a still picture according to the motion information, selects a corresponding picture process, and executes the selected picture process.

13 Claims, 6 Drawing Sheets

FIRST FIELD

SECOND FIELD

TELEVISION RECEIVER AND PICTURE PROCESSING METHOD

BACKGROUND OF THE INVENTION

The present invention relates to a television receiver that receives moving picture data and displays it, and in particular, to a television receiver that has a decoding circuit that receives encoded digital moving picture data and decodes the data and a picture processing method thereof.

In recent years, as digital television broadcasts, DVDs (Digital Versatile Disks), and so forth have been outspread, high quality picture data and sound data have become common. As such mediums have been outspread, television receivers that receive high quality picture data and sound data and output them to a television monitor and a speaker have been developed. Picture data and sound data of digital television broadcasts and DVDs are provided in a data format in which data has been encoded according to a digital moving picture encoding system, such as MPEG-2 (Moving Picture Experts Group-2).

In MEPG-2, when data is encoded, a picture of, for example, an object that moves in fields (or frames) is detected. The difference between a field in which the motion is predicted and the current field is extracted. As a result, the difference is output as a P picture and a B picture. In addition, the motion is output as motion information (moving vector information). MPEG-2 encoded data are decoded with a P picture and a B picture, which are difference data, and the motion information. With the difference data and the motion information, the size of encoded data can be more compacted without deterioration of the picture quality of decoded data.

In the conventional television receiver, a video signal in which MPEG-2 encoded data and so forth have been decoded is supplied as an input signal. Since this type of television receiver directly inputs a video signal, the receiver does not need to have a circuit that decodes MPEG-2 encoded data. Thus, the television receiver can be accomplished with simple circuitry. When the television receiver performs a compensation process and a noise reduction (NR) process corresponding to the motion of a picture, the television receiver needs to detect a motion in field (frame) pictures with the received video signal and obtain motion information once again.

A picture signal processing apparatus that receives a video signal, detects motion information from the video signal, and selectively performs a frame NR process or a field NR process according to the detected result of the motion information has been proposed in Japanese Patent Laid-Open Publication No. 2002-51234.

However, since the conventional television receiver receives a video signal in the foregoing manner, the television receiver needs to perform the motion detection process for each picture of the video signal to obtain motion information of pictures. Thus, when picture data are encoded according to MPEG-2, although motion information is generated, the conventional television receiver cannot use the motion information. The real noise reduction process or the like detects motion information from an input video signal and determines whether an objective field (frame) is a moving picture or a still picture according to the motion information. Thus, the determination accuracy of the noise reduction process is restricted.

In addition, since the television receiver needs to have a circuit that detects a motion, the circuit scale becomes large.

Moreover, it is very difficult to determine whether an entire pattern is a moving picture or a still picture. Thus, depending on a moving pattern, the determination circuit may malfunction. As a result, the reproduction quality of the moving picture deteriorates.

For example, in a noise reduction process circuit that determines whether an object frame is a moving picture or a still picture and adds information of successive frames at a predetermined ratio when the object frame is a still picture, when pictures that slightly move are input to the circuit, since the amount of motion of the input pictures is small, if a moving/still picture determination circuit determines that the input pictures are still pictures, phenomena take place in which, for example, the contour of the picture becomes dim or the picture has a tail.

To suppress the occurrence of such phenomena, if a threshold value by which an object frame is determined to be a moving picture or a still picture is offset to the moving picture side, many pictures are determined to be a moving picture. Thus, the noise reduction process cannot be sufficiently performed.

FIG. 6 shows an example in which the conventional moving/still picture determination circuit malfunctions. FIG. 6A conceptually shows an input stream. In FIG. 6A, a center object denoted by hatched lines slightly moves in arrow directions. Although this stream needs to be determined to be a moving picture, since the amount of motion is small, it is assumed that the stream has been determined to be a still picture.

FIG. 6B conceptually shows the state in which, since an input stream has been determined to be a still picture, in the noise reduction process, several successive frames are added at a predetermined ratio. FIG. 6C shows a picture in which several successive frames have been added at a predetermined ratio. Since an object displayed in each frame actually slightly moves, when these frames are added, as shown in FIG. 6C, the contour of the input stream becomes dim and the picture of the object is displayed as if the object had a tail.

Therefore, an object of the present invention is to provide a television receiver and a picture processing method that determine whether an input stream is a moving picture or a still picture with motion information obtained from encoded data according to a digital moving picture encoding system such as MPEG-2 and perform a different picture process corresponding to the determined result.

Another object of the present invention is to provide a television receiver and a picture processing method that capture motion information from encoded data according to the digital moving picture encoding system such as MPEG-2 without the need to have a motion detection circuit.

A further object of the present invention is to provide a television receiver and a picture processing method that select a mode in which encoded data according to the digital moving picture encoding system such as MPEG-2 are input and motion information contained in the encoded data is used or a mode in which moving picture data that do not contain motion information are input, motion information is detected from the moving picture data, and the detected motion information is used, and that perform a picture process according to the motion information.

SUMMARY OF THE INVENTION

A first aspect of the present invention is a television receiver that inputs encoded picture data that contains motion information used when the picture data was encoded and moving picture data that does not contain the motion information, the television receiver including decoding means for decoding the encoded picture data according to the motion information and for outputting the decoded picture data; picture process means for performing a picture process on the decoded picture data and for outputting the processed data to a display section; and time axis compensation means for supplying motion information according to the decoded picture data to the picture process means in synchronization with the supply of the decoded picture data to the picture process means, wherein the picture process means performs a picture process on the decoded picture data according to the motion information supplied from the time axis compensation means.

A second aspect of the present invention is a picture processing method of inputting encoded picture data that contains motion information used when the picture data was encoded and moving picture data that does not contain the motion information, and performing a predetermined picture process, the method including decoding the encoded picture data according to the motion information and supplying the decoded picture data to a processor supplying motion information according to the decoded picture data to the processor in synchronization with the supply of the decoded picture data to the processor; and performing a picture process on the decoded picture data or the moving picture data, wherein when the decoded picture data is supplied to the processor, the picture process is performed on the decoded picture data according to the motion information supplied to the processor.

According to the present invention, with motion information obtained from encoded data according to the digital moving picture encoding system such as MPEG-2, the input stream is determined to be a moving picture or a still picture. According to the determined result, a different picture process is performed. As a result, the input stream can be accurately determined to be a moving picture or a still picture. In addition, since motion information is captured from encoded data according to the digital moving picture encoding system such as MPEG-2, the circuit structure becomes simple without the need to use a motion detection circuit.

In addition, according to the present invention, a mode in which encoded data according to the digital moving picture encoding system such as MPEG-2 is input and motion information contained in the encoded data is used or a mode in which moving picture data that does not contain motion information is input, motion information is detected from the moving picture data, and the detected motion information to be used can be selected.

DETAILED DESCRIPTION

Next, with reference to the accompanying drawings, an embodiment of the present invention will be described. Pictures that compose a moving picture are categorized as "frames", in which one screen is displayed by one scanning operation (referred to as the non-interlace system), and "fields", in which one screen is displayed by two scanning operations (referred to as the interlace system). In the following, as pictures that compose a moving picture, the case in which fields are handled will be described. However, the present invention is not limited to the case in which fields are handled. Instead, the present invention can be applied to any pictures that are displayed as frames and other formats.

An MPEG decoding circuit, a motion adaptive picture process section, a time axis compensation circuit, a motion detection section, and a switch that will be described later correspond to decoding means, picture process means, time axis compensation means, motion detection means, and selection means, respectively. In addition, moving picture data include encoded data that contain motion information, such as MPEG-2 encoded data, and data that do not contain motion information, such as a video signal. Picture data represent data that compose one display screen of a moving picture (for example, field data or frame data).

Figure 1:
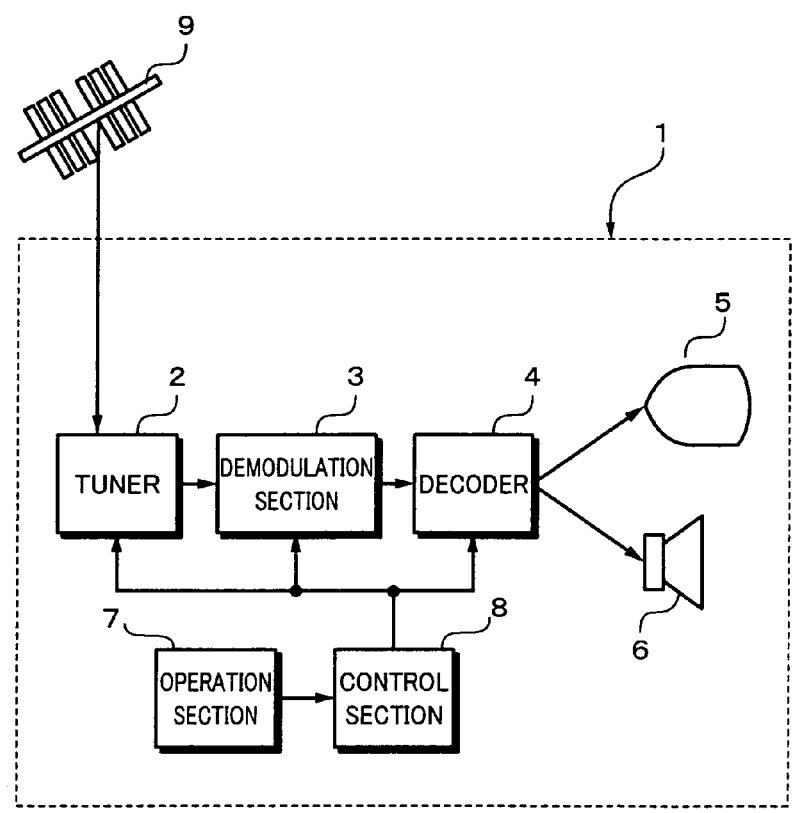
FIG. 1 is a block diagram showing the structure of a television receiver according to an embodiment of the present invention.

FIG. 1 is a block diagram showing structural elements of a television receiver 1 according to an embodiment of the present invention. The television receiver 1 has a tuner 2, a demodulation section 3, a decoder 4, a display section 5, and an audio output section 6. In addition, the television receiver 1 has an operation section 7 and a control section 8.

The tuner 2 receives a television broadcast signal from an antenna 9. The tuner 2 performs amplification, frequency conversion, filtration, and so forth for the received signal and then outputs the processed signal as an IF (Intermediate Frequency) signal to the demodulation section 3. When the tuner 2 receives, for example, a ground wave digital broadcast signal as well as a regular ground wave analog broadcast signal, the tuner 2 receives an ISDB-T OFDM signal as an RF (Radio Frequency) signal through the antenna 9. Each program content of the ground wave digital broadcast utilizes, for example, an ES (Elementary Stream) according to MPEG-2. Next, the case in which a television broadcast signal is reproduced from an MPEG-2 ES will be described.

The demodulation section 3 demodulates not only a regular ground wave analog broadcast signal, but also a received ground wave digital broadcast signal and extracts an MPEG-2 ES (hereinafter referred to as ES data) from the demodulated signal. Thus, the demodulation section 3 performs various processes such as an error correction process, which uses, for example, FFT (Fast Fourier Transform) calculation, de-interleaving, de-mapping, Viterbi decoding, or RS (Reed Solomon) decoding and a demultiplexing process.

Data that have been demodulated by the demodulation section 3 are supplied to the decoder 4. The decoder 4 performs a decoding process for the demodulated data. The ES data contain motion information of a B picture and a P picture of each macro block. According to the present invention, with motion information, each field that has been MPEG decoded is determined to be a moving picture or a still picture. A picture process according to the determined result is performed. A typical example of such a picture process is a noise reduction process.

The decoder 4 decodes the ES data and obtains a video signal corresponding to picture data and an audio signal corresponding to sound data and outputs these signals to corresponding output devices. In other words, the video signal (MPEG video data) is output to the display section 5, whereas the audio signal (MPEG audio data) is output to the audio output section 6.

The display section 5 is a television monitor according to, for example, HDTV (High Definition Television). The audio output section 6 is, for example, a stereo speaker built in the television receiver 1.

The operation section 7 supplies a signal corresponding to a user's operation to the control section 8 to operate the television receiver 1. For example, when the user operates a channel button, the operation section 7 selects a channel of a regular ground wave analog broadcast or a ground digital broadcast corresponding to the operated channel button and supplies the selected channel information to the control section 8.

The control section 8 is a system controller that controls the entire system of the television receiver 1. The control section 8 controls the tuner 2 to select a broadcast wave corresponding to channel information supplied from the operation section 7. In addition, the control section 8 controls the demodulation section 3 and the decoder 4 to perform a demodulation process and a decoding process corresponding to the received broadcast wave.

Figure 2:
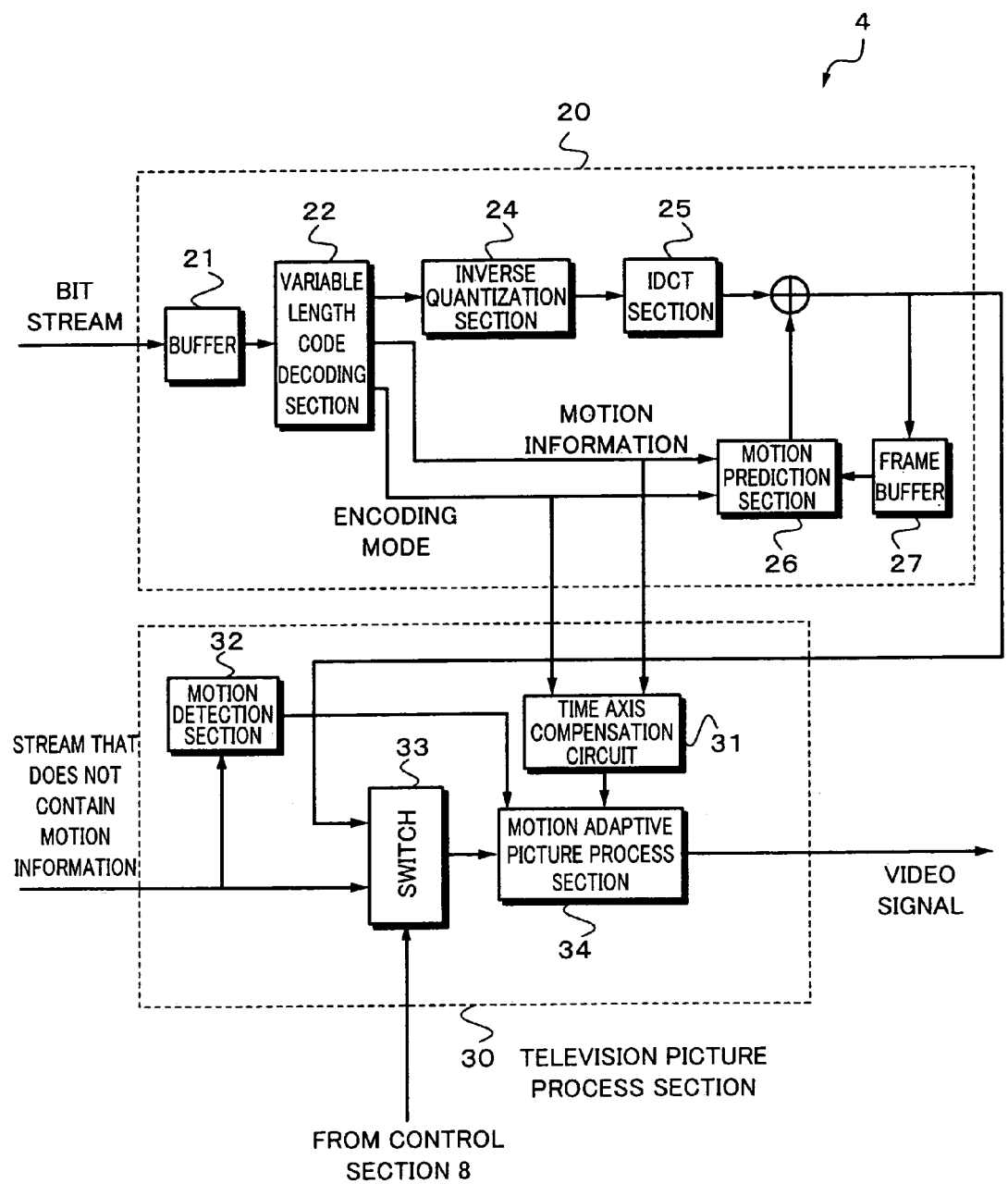
FIG. 2 is a block diagram showing the structure of a decoder of the television receiver shown in FIG. 1.

Next, with reference to FIG. 2, the structure of the decoder 4 according to the present invention will be described. FIG. 2 is a block diagram showing an example of the structure of the decoder 4. The decoder 4 has an MPEG decoding circuit 20 and a television picture process circuit 30. The decoder 4 receives a bit stream of ES data from the demodulation section 3 shown in FIG. 1 and finally outputs a video signal. Although the decoder 4 outputs an audio signal as described above, for simplicity, the description of the process for the audio signal will be omitted.

According to this embodiment, the case in which ES data are handled is described. Instead, moving picture data (data stream) that do not contain motion information may be received. In this case, the data stream is directly supplied to a motion detection section 32 of the television picture process circuit 30. The motion detection section 32 detects motion information from the data stream. When ES data that have been decoded are supplied as a video signal to the decoder 4, the motion detection section 32 receives the ES data.

In an encoding process according to the digital moving picture encoding system typified by MPEG-2, a motion compensation is performed to reduce temporal redundancy of the moving picture signal. In addition, DCT (Discrete Cosine Transform), which is an orthogonal transform algorithm, is performed. DCT coefficients are obtained and quantized to reduce spatial redundancy of the moving picture signal. Thereafter, the quantized DCT coefficients are encoded with variable length codes. As a result, the moving picture signal is further compressed. Finally, ES data are generated.

The decoding process for encoded ES data is the reverse process of the encoding process. In other words, encoded data are encoded with variable length codes to generate quantized DCT coefficients. Inverse quantization, IDCT (Inverse Discrete Cosine Transform), and motion compensation processes are successively performed for the quantized DCT coefficients. As a result, fields that compose a moving picture are reproduced. In the variable length code encoding process, motion information and an encoding mode are output besides the quantized DCT coefficients. Next, how the decoder 4 performs the decoding process for the ES data will be described.

Although the decoding process for the ES data is performed by the MPEG decoding circuit 20 of the decoder 4, this process is basically the same as the conventional MPEG decoding process. In the decoding process, ES data supplied from the demodulation section 3 are stored in a buffer 21. Thereafter, the ES data are supplied to sections that perform the subsequent processes. A variable length code decoding section 22 decodes data with variable length codes, separates the data into quantized DCT coefficients, motion information, and an encoding mode (including a type that identifies a picture, for example, a B picture and a P picture), and supplies the quantized DCT coefficients to an inverse quantization section 24, and the motion information and encoding mode to a motion prediction section 26.

When the inverse quantization section 24 receives the quantized DCT coefficients from the variable length code decoding section 22, the inverse quantization section 24 inversely quantizes them, obtains DCT coefficients, and supplies them to an IDCT (Inverse DCT) section 25. The IDCT section 25 obtains picture data of an I picture, a P picture, and a B picture from the DCT coefficients obtained by the inverse quantization section 24.

When an I picture (Intra-coded picture) is encoded, it uses closed information thereof. Thus, an I picture can be decoded only with information thereof.

When a P picture (Predictive-coded picture) is encoded, it uses an I picture or another P picture that has been decoded in the past as a predictive picture (a reference picture with which a difference is obtained). The difference between the current picture and the predictive picture that has been motion compensated is encoded or the P picture is encoded without the difference. One of these encoded results that has a higher efficiency is selected for each macro block.

When a B picture (Bidirectionally predictive-coded picture) is encoded, it uses three types of pictures that are an I picture or a P picture that has been decoded (in the past) before the current B picture is encoded, an I picture or a P picture that has been decoded (in the future) after the current B picture is encoded, and an interpolated picture generated by the two pictures as predictive pictures (reference pictures with which a difference is obtained). The difference in the three types of pictures that have been motion compensated is encoded or they are intra encoded. One of these encoded results that has the highest efficiency is selected for each macro block.

Thus, there are macro block types that are an intra-frame encoded macro block, a forward inter-frame predictive macro block in which a future macro block is predicted with a past macro block, a backward inter-frame predictive macro block in which a past macro block is predicted with a future macro block, and a bidirectional macro block in which a current macro block is predicted with a past macro block and a future macro block. All macro blocks of an I picture are intra-frame encoded macro blocks. A P picture contains intra-frame encoded macro blocks and forward inter-frame predictive macro blocks. A B picture contains all four types of macro blocks.

When a video signal is reproduced, an I picture is decoded. Based on the I picture, a P picture and a B picture are decoded. For example, decoded pictures are stored as a past reference picture and a future reference picture in a frame memory. When the macro block type is a forward inter-frame predictive macro block, a picture in which a past reference picture has been motion compensated with a moving vector and difference data that have been obtained by inverse DCT are added and decoded picture data are obtained. When the macro block type is a backward inter-frame predictive macro block, a picture of which a future reference picture has been motion compensated with a moving vector and difference data obtained by inverse DCT are added and decoded picture data are obtained.

Picture data obtained in such manner are stored in a frame buffer 27. The motion prediction section 26 generates field picture data with a group of an I picture and a P picture or a group of an I picture, a P picture, and a B picture according to the motion information and encoding mode received from the variable length code decoding section 22 and outputs the field picture data.

The picture data generated by the MPEG decoding circuit 20 are supplied to a motion adaptive picture process section 34 through a switch 33 of the television picture process circuit 30. On the other hand, the motion information and encoding mode supplied from the variable length code decoding section 22 are supplied to a time axis compensation circuit 31 of the television picture process circuit 30. The time axis compensation circuit 31 determines whether the generated field picture data are an I picture, a B picture, or a P picture according to the received encoding mode. When the generated field picture data are a predictive coded picture (a B picture or a P picture), the time axis compensation circuit 31 supplies the motion information of the picture to the motion adaptive picture process section 34 at a timing in which the picture data are supplied to the motion adaptive picture process section 34.

The motion adaptive picture process section 34 performs a picture process for each macro block according to a moving vector or motion information that is composed of a moving vector in a signal process of the motion adaptive picture process section 34.

When the television receiver receives moving picture data (a data stream) that do not contain motion information, the motion detection section 32 of the television picture process circuit 30 detects the difference of fields (motion) from field pictures. The switch 33 selectively inputs moving picture data that contain motion information such as ES data or moving picture data that do not contain motion information according to a control signal received from the control section 8 and supplies the selected moving picture data to the motion adaptive picture process section 34.

Thus, when the motion adaptive picture process section 34 inputs moving picture data that contain motion information such as ES data (from the MPEG decoding circuit 20), the motion adaptive picture process section 34 receives corresponding motion information from the time axis compensation circuit 31 and processes the moving picture data with the motion information. In contrast, when the motion adaptive picture process section 34 inputs moving picture data that do not contain motion information (from the motion detection section 32), the motion adaptive picture process section 34 receives corresponding motion information from the motion detection section 32, which has detected the motion information, and processes the moving picture data with the motion information.

Next, with reference to FIG. 3, a process for picture data (field picture) decoded from ES data will be described. The process is performed by the time axis compensation circuit 31 and the motion adaptive picture process section 34. First of all, at step S10, the time axis compensation circuit 31 receives motion information and an encoding mode from the variable length code decoding section 22 of the MPEG decoding circuit 20. Thus, the time axis compensation circuit 31 knows at what timing what type of decoded picture data will be supplied to the motion adaptive picture process section 34. In addition, the time axis compensation circuit 31 obtains motion information of each picture (a B picture and a P picture).

Next, at step S11, the time axis compensation circuit 31 calculates the timing at which encoded picture data will be input to the motion adaptive picture process section 34 and supplies motion information of the picture data to the motion adaptive picture process section 34 at the timing (this timing adjustment is referred to as a time axis compensation process).

When the motion adaptive picture process section 34 receives the motion information from the time axis compensation circuit 31, the flow advances to step S12. At step S12, the motion adaptive picture process section 34 determines whether the value of the motion information is larger than a predetermined value. When the value of the motion information is larger than the predetermined value (namely, the determined result at step S12 is YES), the input field picture varies from the preceding field picture. In this case, the flow advances to step S13. At step S13, the motion adaptive picture process section 34 performs a moving picture adaptive process for the field. In contrast, when the value of the motion information is equal to or smaller than the predetermined value (namely, the determined result at step S12 is NO), the input field picture does not vary from the preceding field picture. In this case, the flow advances to step S14. At step S14, the motion adaptive picture process section 34 performs a still picture adaptive process for the field.

In the moving picture adaptive process and the still picture adaptive process, when, for example, a noise reduction process is performed, when successive frame pictures are still pictures, they are added at a predetermined ratio. In addition, the value of the motion information is determined for each macro block. The determined result is converted into a determined result of each field. As a result, the picture process is performed for each field. However, the picture process may be performed for each macro block or each group composed of a plurality of macro blocks.

Figure 4:
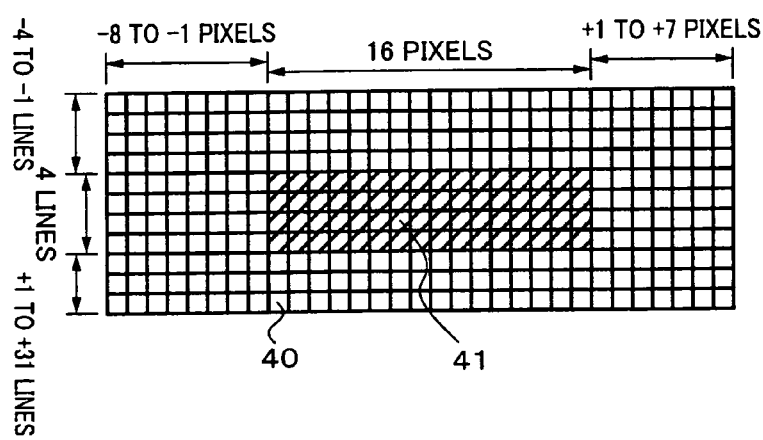
FIG. 4 is a schematic diagram showing input pixels and memory pixels describing a motion detection process of the television receiver according to the embodiment of the present invention.

Next, with reference to FIG. 4 and FIG. 5, the operation of the motion detection section 32 of the television picture process circuit 30 shown in FIG. 2 will be described. According to this embodiment, the motion is detected by a block matching method. As shown in FIG. 4, a unit block of the block matching is an area of 4 lines×16 pixels (for example, a hatched area 41 shown in FIG. 4). The reason why the unit block is horizontally rectangular is that fields are matched and an object likely moves in the horizontal direction. The inter-field matching method cannot correctly detect an object composed of one line.

The block matching is performed with a search block as input pixels (4 lines×16 pixels, a hatched area 41 shown in FIG. 4) and a searched block as memory pixels (11 lines×31 pixels, an area 40 shown in FIG. 4) of the field memory. Thus, 4 upper lines, 3 lower lines, 8 left pixels, and 7 right pixels are searched from the search block. In FIG. 4, the hatched area 41 of 4 lines×16 pixels is the position of vector (0, 0) (the position of data delayed for one field).

Next, the vector detecting procedure will be described in brief.

(1) The center of weight of input pixels and the center of weight of memory pixels are matched by a one-to-three or three-to-one vertical filter to improve the accuracy of the block matching.

(2) The difference values of the input pixels and memory pixels of each block in the searched range (the area 40 shown in FIG. 4) and the sum of the difference values is obtained.
(3) The sums of the difference values of 128 blocks (8 vertical blocks×16 horizontal blocks) are obtained and the average value of the sums is obtained.
(4) The obtained average value and a threshold value that is stored in a register are compared. When the average value is equal to or smaller than the threshold value, the detection of the vector is determined to be valid.
(5) When the detection of the vector has been determined to be valid, the position of a block whose value is the minimum in the search range is designated to be a matched block position. However, the vector is not applied for each block, but each line of each block (the next unit block deviates from a search picture in the memory by one line).
(6) The difference between the memory data at the block position whose value is the minimum and the input data is obtained as noise.
(7) When the detection of the vector has been determined to be invalid, the value of vector (0, 0) is used.

Figure 5A:
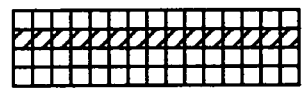
FIGS. 5A and 5B are schematic diagrams showing a first field and a second field describing the motion detection process of the television receiver according to the embodiment of the present invention.
Figure 5B:
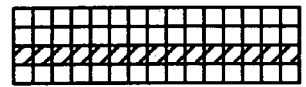
Figure 6A:
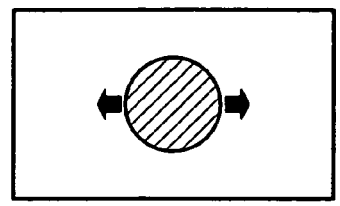
FIGS. 6A, 6B and 6C are schematic diagrams showing the result of a noise reduction process using motion information obtained in a conventional television receiver.
Figure 6B:
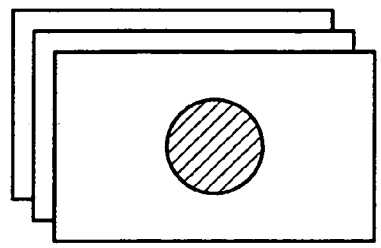
Figure 6C:
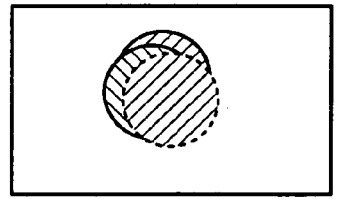

As shown in FIGS. 5A and 5B, the unit (line) of the applied vector of the first field is different from that of the next field, the second field.

The moving vector obtained by the motion detection section 32 in the foregoing procedure is supplied as motion information to the motion adaptive picture process section 34. Moving picture data that do not contain motion information are input as a field picture to the motion adaptive picture process section 34 through the switch 33 according to a control signal received from the control section 8.

Figure 3:
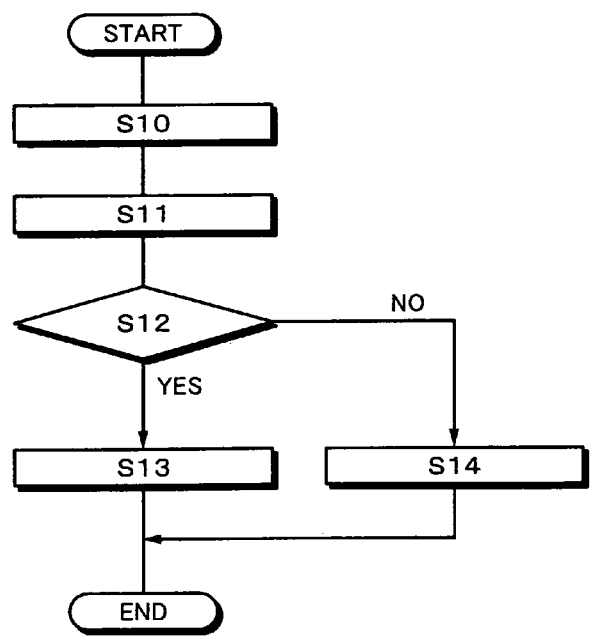
FIG. 3 is a flow chart of a process that performs a picture process according to the determination of motion information in the television receiver according to the embodiment of the present invention.

Thereafter, the same operation after step S12 shown in FIG. 3 is performed. In other words, when the motion adaptive picture process section 34 receives the motion information, the motion adaptive picture process section 34 determines whether the value of the motion information is larger than a predetermined value. When the value of the motion information is larger than the predetermined value, it represents that the input field picture varies from the preceding field picture. In this case, the moving picture adaptive process is performed for the field. In contrast, when the value of the motion information is equal to or smaller than the predetermined value, it represents that the input field picture does not vary from the preceding field picture. In this case, the still picture adaptive process is executed for the field.

In the foregoing embodiment, MPEG-2 moving picture data are input. However, the present invention is not limited to MPEG-2 moving picture data. Instead, the present invention can be applied to any moving picture data as long as it contains motion compensation motion information.

According to the present invention, motion information obtained from encoded data according to a digital moving picture encoding system such as MPEG-2 is used. With the obtained motion information, an input stream is determined to be a moving picture or a still picture. According to the determined result, a different picture process can be performed.

In addition, according to the present invention, motion information is captured from encoded data according to the digital moving picture encoding system such as MPEG-2. Thus, the motion detection circuit can be omitted. As a result, a television receiver can be accomplished with a simple circuit structure.

In addition, according to the present invention, the mode in which encoded data according to the digital moving picture encoding system such as MPEG-2 are input and motion information contained in the encoded data are used or the mode in which moving picture data that do not contain motion information are input, motion information is detected from the data, and the detected motion information is used can be selected and a picture process can be performed according to the motion information.

The invention claimed is:

1. A television receiver that inputs encoded picture data that contains motion information used when the picture data was encoded and moving picture data that does not contain the motion information, the television receiver comprising:
   decoding means for decoding the encoded picture data that contains motion information according to the motion information and for outputting the decoded picture data;
   picture process means for performing a picture process on the decoded picture data and for outputting the processed data to a display section; and
   time axis compensation means for supplying motion information according to the decoded picture data to the picture process means in synchronization with the supply of the decoded picture data to the picture process means,
   wherein the picture process means performs a picture process on the decoded picture data according to the motion information supplied from the time axis compensation means,
   and in which the television receiver further comprises:
   motion detection means for inputting the moving picture data that does not contain the motion information, detecting motion information of the moving picture data, and supplying the detected motion information to the picture process means,
   wherein when the moving picture data are input to the motion detection means, the picture process means performs a picture process on the moving picture data according to the detected motion information, and
   wherein of (i) the encoded picture data that contains motion information and (ii) the moving picture data that does not contain the motion information, the decoding means only receives the encoded picture data that contains motion information such that the decoding means does not receive the moving picture data that does not contain the motion information, and the motion detection means only receives as an input the moving picture data that does not contain the motion information such that the motion detection means does not receive as an input the encoded picture data that contains motion information.

2. The television receiver as set forth in claim 1, wherein the encoded picture data contains difference data against a reference picture, and
   the decoding means adds past or future picture data generated according to the motion information and the difference data to generate the decoded picture data.

3. The television receiver as set forth in claim 1, wherein the motion information is a moving vector detected for each macro block composed of a plurality of pixels, and
   the picture process means references the moving vector for each macro block and performs the picture process.

4. The television receiver as set forth in claim 1,
   wherein when the motion information supplied from the time axis compensation means exceeds a predetermined value, the picture process means performs a moving picture adaptive process on the picture data and when the motion information supplied from the time axis compensation means is less than or equal to the predetermined value, the picture process means performs a still picture adaptive process on the picture data.

5. The television receiver as set forth in claim 1, wherein the picture process means is a noise reduction circuit that adds picture data of successive frames to the decoded picture data at a predetermined ratio according to the motion information supplied from the time axis compensation means.

6. The television receiver as set forth in claim 1, wherein the picture process means is a noise reduction circuit that adds picture data of successive frames to the decoded picture data at a predetermined ratio when the motion information supplied from the time axis compensation means or the detected motion information is less than or equal to a predetermined value.

7. The television receiving as set forth in claim 1, further comprising:
an operation section that selects a channel in which a broadcast signal modulated as the encoded picture data has been received or a channel in which a broadcast signal demodulated as the moving picture data has been received;
selection means for supplying the decoded picture data or the non-encoded picture data to the picture process means; and
control means for controlling the selection means according to channel information selected by the operation section.

8. The television receiver as set forth in claim 1, wherein the decoding means does not include a motion detection circuit.

9. A television receiver that inputs encoded picture data that contains motion information used when the picture data was encoded and moving picture data that does not contain the motion information, the television receiver comprising:
decoding means for decoding the encoded picture data according to the motion information and for outputting the decoded picture data;
picture process means for performing a picture process on the decoded picture data and for outputting the processed data to a display section; and
time axis compensation means for supplying motion information according to the decoded picture data to the picture process means in synchronization with the supply of the decoded picture data to the picture process means,
wherein the picture process means performs a picture process on the decoded picture data according to the motion information supplied from the time axis compensation means, and
wherein
the encoded picture data is an elementary stream according to the MPEG2 system, and
the time axis compensation means supplies the motion information to the picture process means in synchronization with the supply of the decoded picture data to the picture process means according to encoding mode information representing the type of the encoded picture data supplied together with the motion information from the decoding means.

10. A picture processing method of inputting encoded picture data that contains motion information used when the picture data was encoded and moving picture data that does not contain the motion information, and performing a predetermined picture process, the method comprising the steps of:
decoding by use of a decoder the encoded picture data that contains motion information according to the motion information and supplying the decoded picture data to a processor;
supplying motion information according to the decoded picture data to the processor in synchronization with the supply of the decoded picture data to the processor; and
performing a picture process on the decoded picture data or the moving picture data,
wherein when the decoded picture data is supplied to the processor, the picture process is performed on the decoded picture data according to the motion information supplied to the processor, and
in which the method further comprises:
inputting the moving picture data that does not contain the motion information, detecting motion information of the moving picture data by use of a motion detection circuit, and supplying the detected motion information to the processor,
wherein the performing step performs a picture process on the moving picture data according to the detected motion information supplied to the processor, and
wherein of (i) the encoded picture data that contains motion information and (ii) the moving picture data that does not contain the motion information, the decoder only receives the encoded picture data that contains motion information such that the decoder does not receive the moving picture data that does not contain the motion information, and the motion detection circuit only receives as an input the moving picture data that does not contain the motion information such that the motion detection circuit does not receive as an input the encoded picture data that contains motion information.

11. The picture processing method as set forth in claim 10, wherein the picture process is a noise reduction process that adds picture data of successive frames at a predetermined ratio when the motion information supplied to the processor is less than or equal to a predetermined value.

12. The picture processing method as set forth in claim 10, wherein the picture process is a noise reduction process that adds picture data of successive frames to the decoded picture data at a predetermined ratio according to the motion information supplied to the processor.

13. A picture processing method of inputting encoded picture data that contains motion information used when the picture data was encoded and moving picture data that does not contain the motion information, and performing a predetermined picture process, the method comprising the steps of:
decoding the encoded picture data according to the motion information and supplying the decoded picture data to a processor;
supplying motion information according to the decoded picture data to the processor in synchronization with the supply of the decoded picture data to the processor; and
performing a picture process on the decoded picture data or the moving picture data,
wherein when the decoded picture data is supplied to the processor, the picture process is performed on the decoded picture data according to the motion information supplied to the processor, and
wherein
the encoded picture data is an elementary stream according to the MPEG2 system, and
the motion information is supplied to the processor in synchronization with the supply of the decoded picture data to the processor according to encoding mode information that represents the type of the encoded picture data supplied together with the motion information from the decoding step.

* * * * *